US011173574B2

(12) United States Patent
Worthing, Jr. et al.

(10) Patent No.: US 11,173,574 B2
(45) Date of Patent: Nov. 16, 2021

(54) WORKPIECE-ASSEMBLY AND ADDITIVE MANUFACTURING SYSTEMS AND METHODS OF ADDITIVELY PRINTING ON WORKPIECES

(71) Applicant: General Electric Company, Schenectady, NY (US)

(72) Inventors: Richard Roy Worthing, Jr., Liberty Township, OH (US); Joseph Edward Hampshire, West Chester, OH (US); Jinjie Shi, Mason, OH (US)

(73) Assignee: General Electric Company, Schenectady, NY (US)

( * ) Notice: Subject to any disclaimer, the term of this patent is extended or adjusted under 35 U.S.C. 154(b) by 297 days.

(21) Appl. No.: 16/261,717

(22) Filed: Jan. 30, 2019

(65) Prior Publication Data
US 2020/0238446 A1 Jul. 30, 2020

(51) Int. Cl.
*B23K 26/34* (2014.01)
*B33Y 10/00* (2015.01)
(Continued)

(52) U.S. Cl.
CPC .......... *B23K 37/04* (2013.01); *B23K 15/0086* (2013.01); *B23K 26/34* (2013.01);
(Continued)

(58) Field of Classification Search
CPC .. B23K 26/34–342; B33Y 10/00; B33Y 30/00
See application file for complete search history.

(56) References Cited

U.S. PATENT DOCUMENTS

| 2,722,867 A | 11/1955 | Dackor et al. |
| 5,415,384 A | 5/1995 | Obrist et al. |

(Continued)

FOREIGN PATENT DOCUMENTS

| CN | 105598450 A | 5/2016 |
| CN | 107282923 A | 10/2017 |

(Continued)

OTHER PUBLICATIONS

Praniewicz et al, "Adaptive geometry transformation and repair for hybrid manufacturing", Procedia Manufacturing 26,2018, pp. 228-236.

(Continued)

*Primary Examiner* — Michael A Laflame, Jr.
(74) *Attorney, Agent, or Firm* — Fitch, Even, Tabin & Flannery, LLP

(57) ABSTRACT

Provided are workpiece-assemblies, and systems and methods for aligning a plurality of workpieces with a build plane. A system may include an alignment plate, one or more elevating blocks, and a workpiece-assembly. A workpiece-assembly may include a build plate that has a plurality of workpiece docks, a plurality of workpiece shoes that have a slot configured to receive a portion of one or more workpieces respectively inserted or insertable into the plurality of workpiece docks, a plurality of biasing members respectively situated or situatable between the build plate and the plurality of workpiece shoes so as to exert a biasing force upon the workpiece shoes, and one or more clamping mechanisms coupled or couplable to the build plate and operable to secure the plurality of workpiece shoes within the respective workpiece docks.

20 Claims, 10 Drawing Sheets

(51) Int. Cl.
*B33Y 30/00* (2015.01)
*B23K 37/04* (2006.01)
*B23K 26/354* (2014.01)
*B23K 15/00* (2006.01)
*B33Y 80/00* (2015.01)

(52) U.S. Cl.
CPC ............ *B23K 26/354* (2015.10); *B33Y 10/00* (2014.12); *B33Y 30/00* (2014.12); *B33Y 80/00* (2014.12)

(56) References Cited

U.S. PATENT DOCUMENTS

| | | |
|---|---|---|
| 5,702,574 A | 12/1997 | Foster et al. |
| 5,810,344 A | 9/1998 | Nishimoto |
| 5,879,753 A | 3/1999 | Zajchowski et al. |
| 5,913,555 A | 6/1999 | Richter et al. |
| 6,161,826 A | 12/2000 | Forrer |
| 6,401,000 B1 | 6/2002 | Suzuki et al. |
| 6,435,596 B1 | 8/2002 | Phillips |
| 6,449,529 B1 | 9/2002 | Oleksy |
| 6,532,656 B1 | 3/2003 | Wilkins et al. |
| 6,641,128 B2 | 11/2003 | Fries |
| 6,895,350 B2 | 5/2005 | Suzuki et al. |
| 6,908,288 B2 | 6/2005 | Jackson et al. |
| 6,986,654 B2 | 1/2006 | Imiolek et al. |
| 6,993,818 B2 | 2/2006 | Smith et al. |
| 7,009,137 B2 | 3/2006 | Guo |
| 7,034,246 B2 | 4/2006 | Muylaert et al. |
| 7,261,550 B2 | 8/2007 | Herzog |
| 7,357,629 B2 | 4/2008 | Weiskopf et al. |
| 7,449,658 B2 | 11/2008 | Mielke |
| 7,520,495 B2 | 4/2009 | Stark |
| 7,587,818 B2 | 9/2009 | Gorman et al. |
| 7,665,717 B2 | 2/2010 | Lenzini |
| 7,674,107 B2 | 3/2010 | Perret et al. |
| 7,790,096 B2 | 9/2010 | Merot et al. |
| 8,056,606 B2 | 11/2011 | Hasz |
| 8,801,502 B2 | 8/2014 | Ng et al. |
| 8,875,392 B2 | 11/2014 | Richter |
| 8,920,063 B1 | 12/2014 | Easley |
| 8,996,156 B2 | 3/2015 | Melzer-Jokisch et al. |
| 9,073,156 B2 | 7/2015 | Clark et al. |
| 9,216,484 B2 | 12/2015 | Bishop et al. |
| 9,283,593 B2 | 3/2016 | Bruck et al. |
| 9,289,861 B2 | 3/2016 | Czemer |
| 9,302,359 B2 | 4/2016 | Hediger |
| 9,435,211 B2 | 9/2016 | Xu |
| 9,452,474 B2 | 9/2016 | Xu |
| 9,555,522 B2 | 1/2017 | Evans et al. |
| 9,884,393 B2 | 2/2018 | Roberts et al. |
| 9,919,474 B2 | 3/2018 | Napadensky |
| 9,943,933 B2 | 4/2018 | Zu et al. |
| 10,035,223 B2 | 7/2018 | Ladewig et al. |
| 10,086,481 B2 | 10/2018 | Krol et al. |
| 2002/0104973 A1 | 8/2002 | Kerekes |
| 2003/0214571 A1 | 11/2003 | Ishikawa et al. |
| 2004/0191064 A1 | 9/2004 | Guo |
| 2006/0107610 A1 | 5/2006 | Boserio |
| 2007/0003416 A1 | 1/2007 | Bewlay et al. |
| 2007/0077323 A1 | 4/2007 | Stonesmith et al. |
| 2010/0028158 A1 | 2/2010 | Richter |
| 2010/0044944 A1 | 2/2010 | Korn et al. |
| 2012/0076578 A1 | 3/2012 | Schron, Sr. et al. |
| 2012/0085875 A1 | 4/2012 | Hoyt et al. |
| 2014/0023426 A1 | 1/2014 | Schron, Sr. et al. |
| 2014/0163717 A1 | 6/2014 | Das et al. |
| 2014/0259668 A1 | 9/2014 | Henderson et al. |
| 2015/0079306 A1 | 3/2015 | Schoenebom et al. |
| 2015/0165556 A1 | 6/2015 | Jones et al. |
| 2015/0224607 A1 | 8/2015 | Bruck et al. |
| 2015/0336271 A1 | 11/2015 | Spicer et al. |
| 2016/0023403 A1 | 1/2016 | Ramos et al. |
| 2016/0069184 A1 | 3/2016 | Ribic et al. |
| 2016/0074965 A1 | 3/2016 | Jakimov et al. |
| 2016/0121438 A1 | 5/2016 | Ladewig et al. |
| 2016/0159011 A1 | 6/2016 | Marchione et al. |
| 2016/0167172 A1 | 6/2016 | Goncharov et al. |
| 2016/0250724 A1 | 9/2016 | Krol et al. |
| 2016/0305777 A1 | 10/2016 | Racine et al. |
| 2016/0318257 A1 | 11/2016 | Brooks et al. |
| 2017/0009584 A1 | 1/2017 | Cui et al. |
| 2017/0056975 A1 | 3/2017 | Carter et al. |
| 2017/0106482 A1 | 4/2017 | Roberts et al. |
| 2017/0120337 A1 | 5/2017 | Kanko et al. |
| 2017/0165922 A1 | 6/2017 | Hakkaku |
| 2017/0259502 A1 | 9/2017 | Chapiro et al. |
| 2018/0038385 A1 | 2/2018 | Welch |
| 2018/0056393 A1 | 3/2018 | Herzog et al. |
| 2018/0079033 A1 | 3/2018 | Krueger et al. |
| 2018/0111319 A1 | 4/2018 | Brezoczky et al. |
| 2018/0200800 A1 | 7/2018 | Hart et al. |
| 2018/0207875 A1 | 7/2018 | Menchik |
| 2018/0236504 A1 | 8/2018 | Pourcher et al. |
| 2018/0236556 A1 | 8/2018 | Garay et al. |
| 2018/0236558 A1 | 8/2018 | Garay et al. |
| 2018/0238172 A1 | 8/2018 | Garay et al. |
| 2018/0238173 A1 | 8/2018 | Garay et al. |
| 2018/0243866 A1 | 8/2018 | Srinivasan et al. |
| 2018/0333813 A1 | 11/2018 | Hornbeck |
| 2018/0348367 A1 | 12/2018 | Clear et al. |
| 2019/0009472 A1 | 1/2019 | Mark |
| 2019/0015899 A1 | 1/2019 | Chaput et al. |
| 2019/0022760 A1 | 1/2019 | Coskun et al. |
| 2019/0060998 A1 | 2/2019 | Kelkar et al. |
| 2019/0072933 A1 | 3/2019 | Wu et al. |
| 2019/0358755 A1* | 11/2019 | Ott .......................... B22F 7/062 |

FOREIGN PATENT DOCUMENTS

| | | |
|---|---|---|
| DE | 29907262 U1 | 7/1999 |
| DE | 102011102543 A1 | 11/2012 |
| DE | 102010001414 B4 | 5/2013 |
| DE | 102012011217 A1 | 12/2013 |
| DE | 102013213260 A1 | 1/2015 |
| DE | 102017201994 A1 | 8/2018 |
| DE | 102018112248 A1 | 12/2018 |
| EP | 1637274 A1 | 3/2006 |
| EP | 2848335 A1 | 3/2015 |
| EP | 3023177 A1 | 5/2016 |
| EP | 3159080 A1 | 4/2017 |
| EP | 3450058 A1 | 3/2019 |
| FR | 3054799 A1 | 2/2018 |
| GB | 2181374 A | 4/1987 |
| GB | 2453945 | 4/2009 |
| JP | 2009/056511 A | 3/2009 |
| JP | 2010/120104 A | 6/2010 |
| JP | 2016/532586 A | 10/2016 |
| JP | 2017/217674 A | 12/2017 |
| JP | 2018/001723 A | 1/2018 |
| WO | WO2015118180 A1 | 8/2015 |
| WO | WO2016/075802 A1 | 5/2016 |
| WO | WO2017074373 A1 | 5/2017 |
| WO | WO2017/100695 A1 | 6/2017 |
| WO | WO2018//145912 A1 | 8/2018 |
| WO | WO2018145912 A1 | 8/2018 |

OTHER PUBLICATIONS

Praniewicz et al, "An Adaptive Geometry Transformation and Repair Method for Manufacturing", Journal of Manufacturing Science and Engineering, vol. 141, Sep. 2018, pp. 2-8.
Wilson et al, "Remanufacturing of turbine blades by laser direct deposition with its energy and environmental impact analysis", Journal of Cleaner Production 80, 2014, pp. 170-178.
Mitee-Bite Products, LLC, Workholding Specialists, Sep. 2017 Catalog, 52 Pages.
JONES et al., Remanufacture of turbine blades by laser cladding, machining and in-process scanning in a single machine, Proceedings from 23$^{rd}$ Annual International Solid Freeform Fabrication Symposium Aug. 16, 2012, pp. 821-827.
European Search Report Corresponding to Application No. 20151717 dated Jun. 11, 2020.

(56) References Cited

OTHER PUBLICATIONS

PENG et al., Influence of Energy Density on Energy Demand and Porosity of 316L Stainless Steel Fabricated by Selective Laser Melting, International Journal of Precision Engineering and Manufacturing—Green Technology, vol. 5, No. 1, Jan. 2018, pp. 5562.
GU et al., Influences of Energy Density on Porosity and Microstructure of Selective Laser Melted 17-4PH Stainless Steel. 24th International SFF Symposium—An Additive Manufacturing Conference, Aug. 16, 2013, pp. 474-489.
LIU et al., Effects of melt-pool geometry on crystal growth and microstructure development in laser surface-melted superalloy single crystals, Mathematical modeling of single-crystal growth in a melt pool (Part 1), Science Direct, Acta Materialia, vol. 52, 2004, pp. 4833-4847.
European Search Report Corresponding to Application No. 20151688 dated Mar. 30, 2020.
European Search Report Corresponding to Application No. 20151670 dated Jun. 8, 2020.
European Search Report Corresponding to Application No. 20151679 dated Apr. 2, 2020.
European Search Report Corresponding to Application No. 20151734 dated Apr. 2, 2020.
European Search Report Corresponding to Application No. 20151810 dated May 15, 2020.
European Search Report Corresponding to Application No. 20178188 dated Nov. 3, 2020.
International Search Report Corresponding to Application No. PCT/SG2019/050049 dated Mar. 27, 2019.
Machine Translated Japanese Office Action Corresponding to Application No. 2020010732 dated Jan. 19, 2021.
Machine Translated Japanese Search Report Corresponding to Application No. 2020010713 dated Nov. 18, 2020.
USAF C-5 Galaxy, as shown in ETSY desk model set (Galaxy). (Year: 2021).

\* cited by examiner

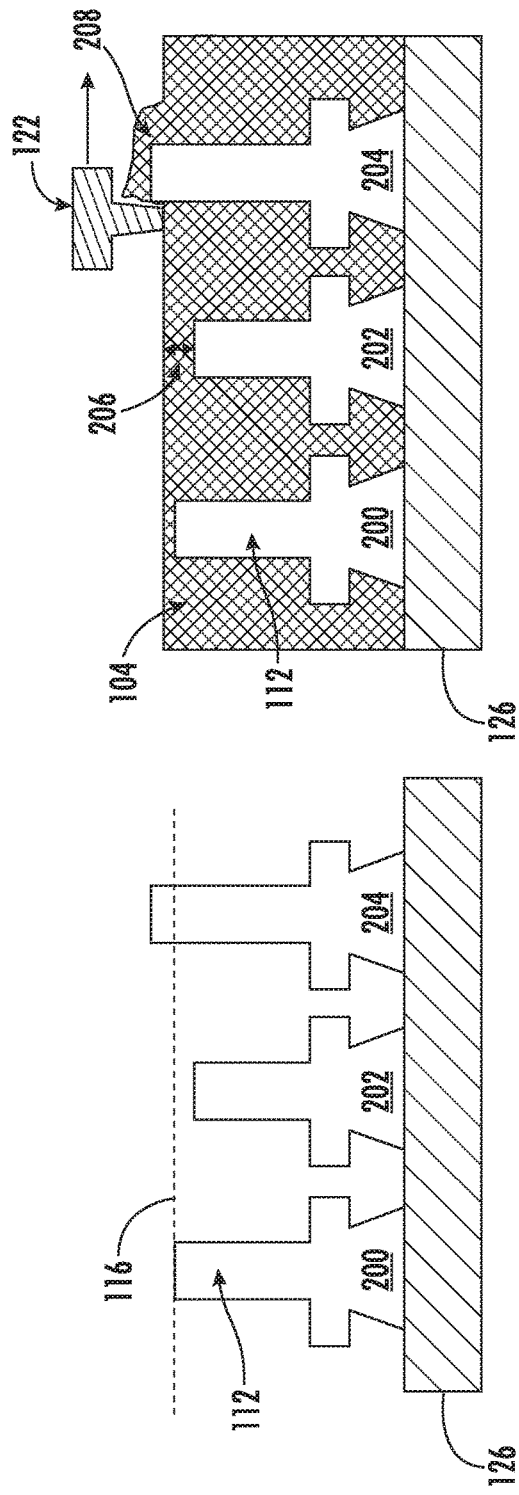
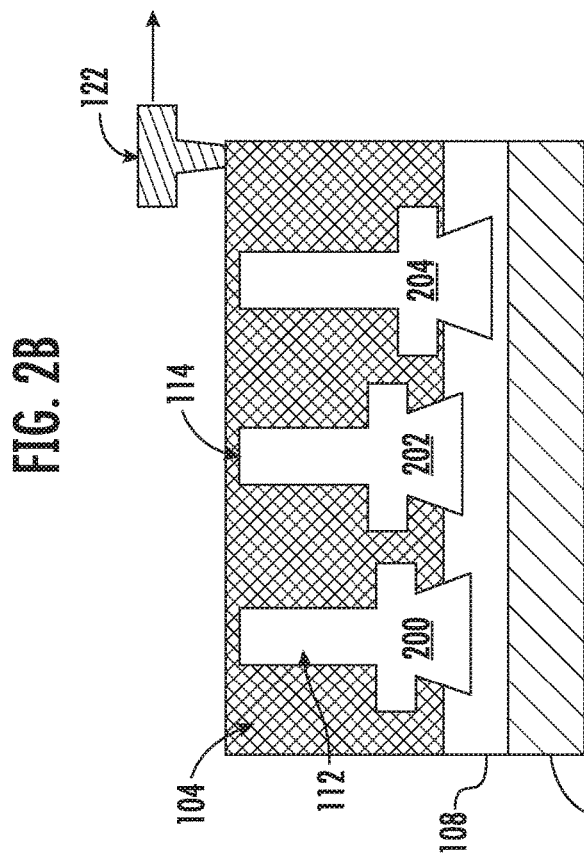
FIG. 2A
FIG. 2B
FIG. 3A
FIG. 3B

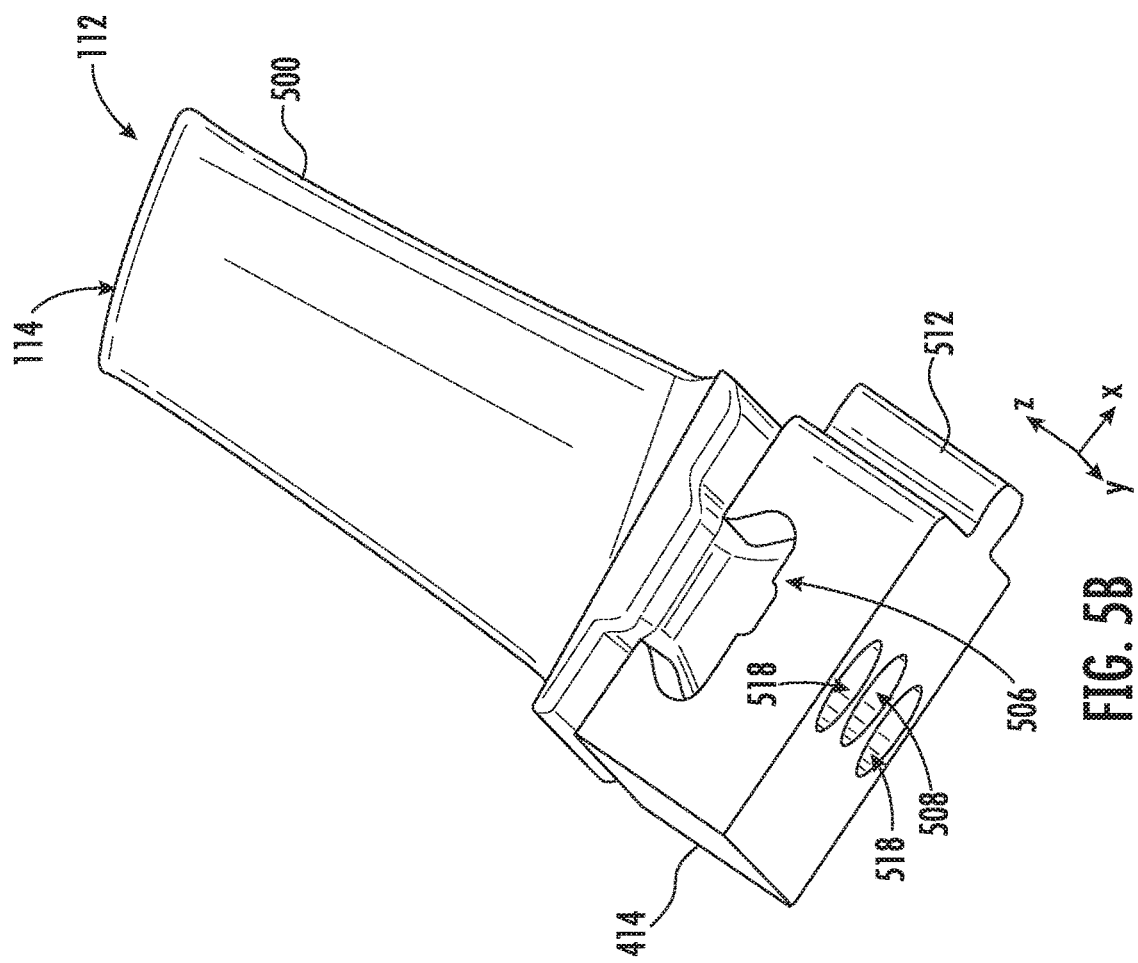
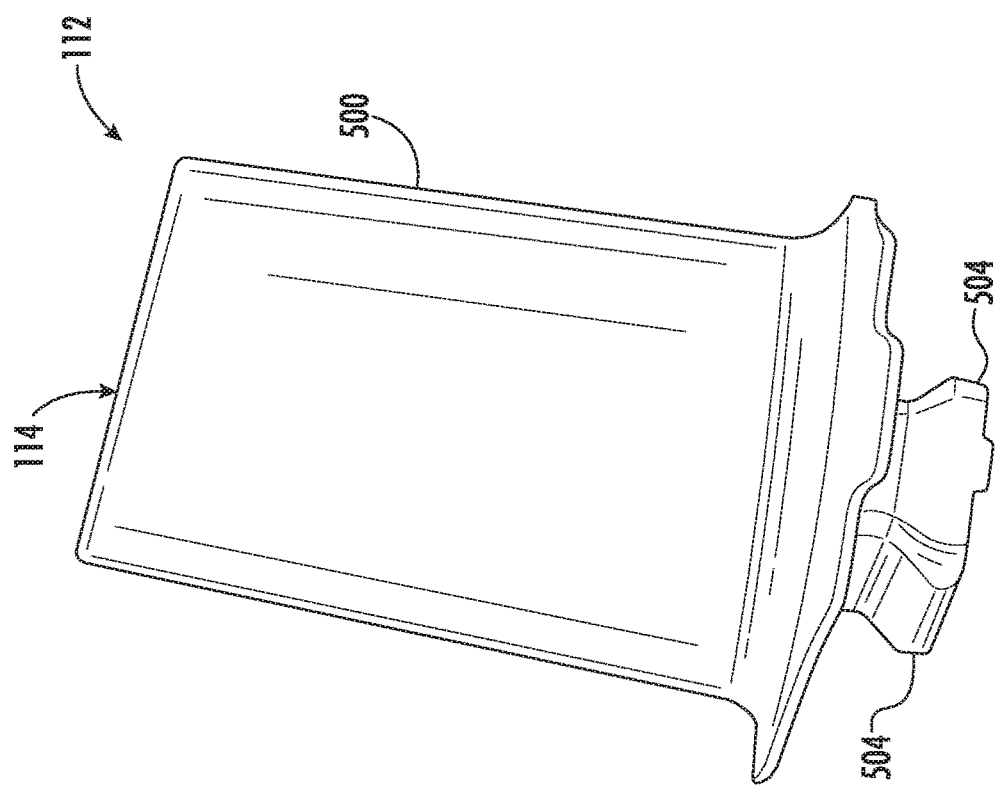

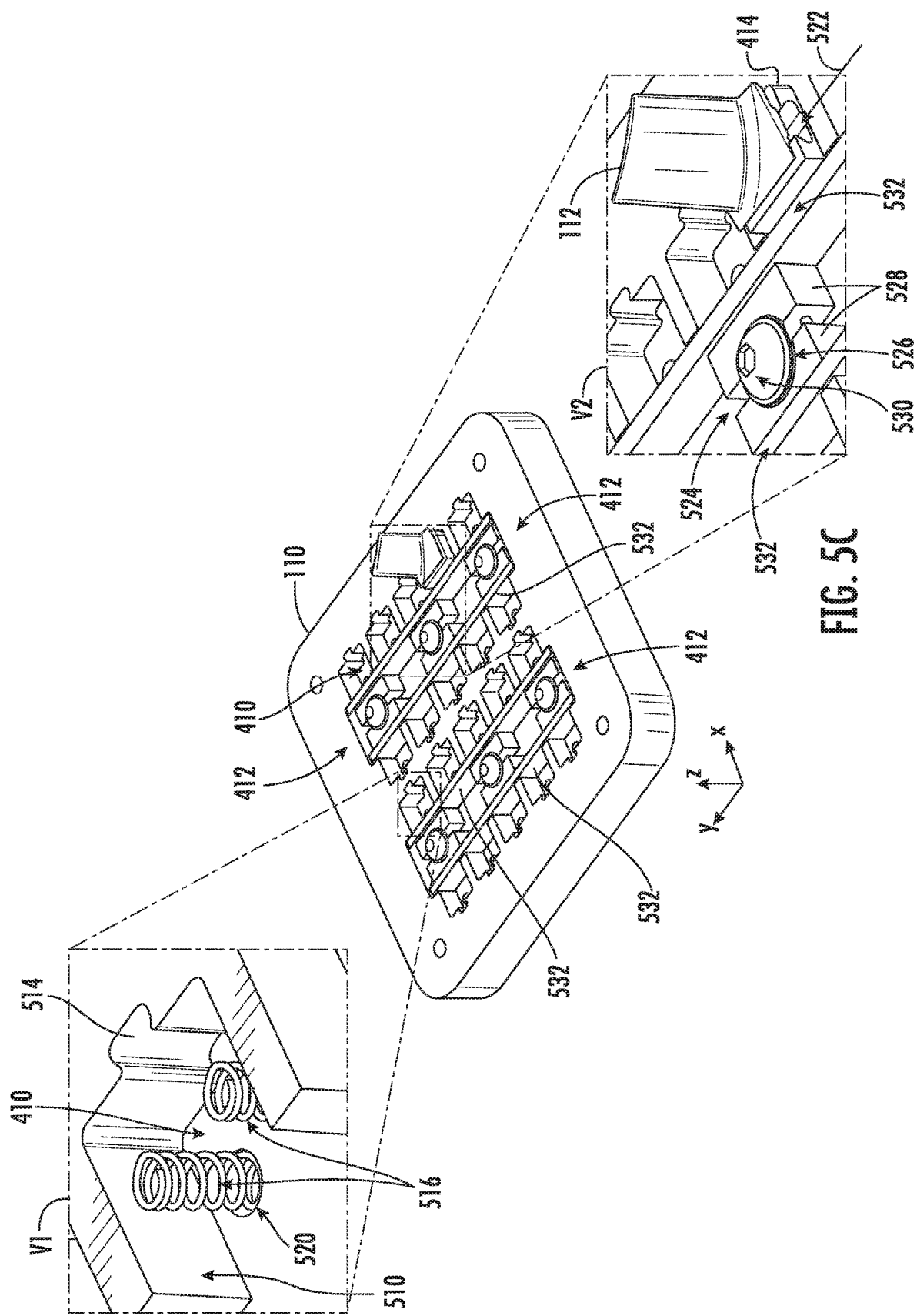

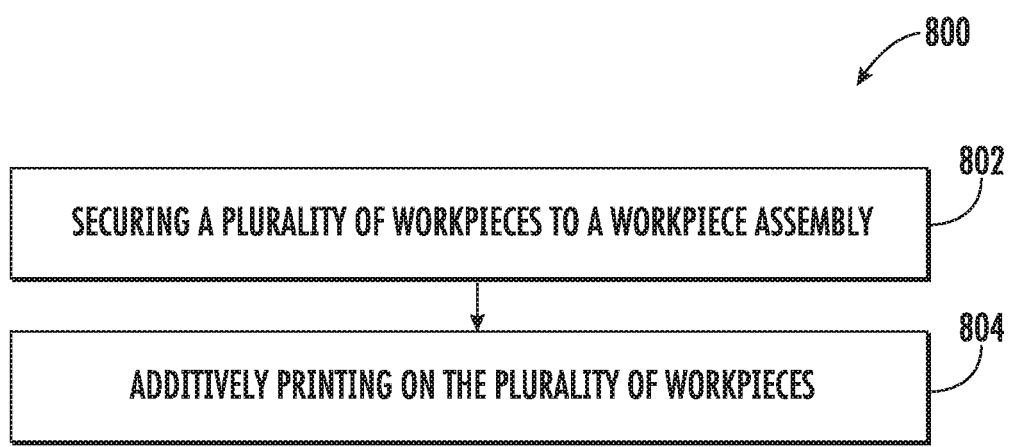

WORKPIECE-ASSEMBLY AND ADDITIVE MANUFACTURING SYSTEMS AND METHODS OF ADDITIVELY PRINTING ON WORKPIECES

FIELD

The present disclosure generally pertains to workpiece-assemblies for additively printing on workpieces and additive manufacturing systems and methods of additively printing on workpieces, including workpiece-assemblies configured to position and hold a plurality of workpieces at a common build plane for additively printing on the workpieces.

BACKGROUND

According to the present disclosure, it would be desirable to utilize an additive manufacturing machine or system to additively print onto pre-exiting workpieces, including additively printing onto a plurality of pre-existing workpieces as part of a single build. When additively printing onto such workpieces, it would be desirable for additive manufacturing machines, systems, and methods to additively print onto pre-existing workpieces with sufficient precision and accuracy so as to provide near net shape components. Accordingly, there exists a need for improved additive manufacturing machines and systems, and methods of additively printing on workpieces.

The workpieces contemplated by the present disclosure include originally fabricated workpieces, as well as workpieces intended to be repaired, rebuilt, upgraded, and so forth, such as machine or device components that may experience damage, wear, and/or degradation throughout their service life. It would be desirable to additively print on workpieces such as machine or device components so as to repair, rebuild, or upgrade such components. It would also be desirable to additively print on workpieces so as to produce new components such as components that may exhibit an enhanced performance or service life.

One example of a machine or device component includes an air foil, such as a compressor blade or a turbine blade used in a turbomachine. These air foils frequently experience damage, wear, and/or degradation throughout their service life. For example, serviced air foils, such as compressor blades of a gas turbine engine show erosion, defects, and/or cracks after long term use. Specifically, for example, such blades are subject to significant high stresses and temperatures which inevitably cause blades to wear over time, particularly near the tip of the blade. For example, blade tips are susceptible to wear or damage from friction or rubbing between the blade tips and turbomachine shrouds, from chemical degradation or oxidation from hot gasses, from fatigue caused by cyclic loading and unloading, from diffusion creep of crystalline lattices, and so forth.

Notably, worn or damaged blades may result in machine failure or performance degradation if not corrected. Specifically, such blades may cause a turbomachine to exhibit reduced operating efficiency as gaps between blade tips and turbomachine shrouds may allow gasses to leak through the turbomachine stages without being converted to mechanical energy. When efficiency drops below specified levels, the turbomachine is typically removed from service for overhaul and repair. Moreover, weakened blades may result in complete fractures and catastrophic failure of the engine.

As a result, compressor blades for a turbomachine are typically the target of frequent inspections, repairs, or replacements. It is typically expensive to replace such blades altogether, however, some can be repaired for extended lifetime at relatively low cost (as compared to replacement with entirely new blades). Nevertheless, traditional repair processes tend to be labor intensive and time consuming.

For example, a traditional repair process uses a welding/cladding technique whereby repair material may be supplied to a repair surface in either powder or wire form, and the repair material may be melted and bonded to the repair surface using a focused power source such as a laser, e-beam, plasma arc, or the like. However, blades repaired with such a welding/cladding technique also undergo tedious post-processing to achieve the target geometry and surface finish. Specifically, due to the bulky feature size of the welding/cladding repair material bonded to the repair surface, the repaired blades require heavy machining to remove extra material followed by polishing to achieve a target surface finish. Notably, such machining and polishing processes are performed on a single blade at a time, are labor intensive and tedious, and result in large overall labor costs for a single repair.

Alternatively, other direct-energy-deposition (DED) methods may be used for blade repair, e.g., such as cold spray, which directs high-speed metal powders to bombard the target or base component such that the powders deform and deposit on the base component. However, none of these DED methods are suitable for batch processing or for repairing a large number of components in a time-efficient manner, thus providing little or no business value.

Accordingly, there exists a need for improved apparatuses, systems, and methods for additively manufacturing near net shape components that include an extension segment additively printed on a workpiece, including apparatuses, systems, and methods of repairing workpieces such as compressor blades and turbine blades.

BRIEF DESCRIPTION

Aspects and advantages will be set forth in part in the following description, or may be obvious from the description, or may be learned through practicing the presently disclosed subject matter.

In one aspect, the present disclosure embraces workpiece-assemblies configured to align a plurality of workpieces with a build plane. An exemplary workpiece assembly may include a build plate that has a plurality of workpiece docks, a plurality of workpiece shoes that have a slot configured to receive a portion of one or more workpieces respectively inserted or insertable into the plurality of workpiece docks, a plurality of biasing members respectively situated or situatable between the build plate and the plurality of workpiece shoes so as to exert a biasing force upon the workpiece shoes, and one or more clamping mechanisms coupled or couplable to the build plate and operable to secure the plurality of workpiece shoes within the respective workpiece docks.

In another aspect, the present disclosure embraces systems for aligning a plurality of workpiece with a build plane. An exemplary system may include an alignment plate, one or more elevating blocks, and a workpiece-assembly. The workpiece-assembly may include a build plate that has a plurality of workpiece docks, a plurality of workpiece shoes that have a slot configured to receive a portion of one or more workpieces respectively inserted or insertable into the plurality of workpiece docks, a plurality of biasing members respectively situated or situatable between the build plate and the plurality of workpiece shoes so as to exert a biasing force upon the workpiece shoes, and one or more clamping mechanisms coupled or couplable to the build plate and operable to secure the plurality of workpiece shoes within the respective workpiece docks.

In yet another aspect, the present disclosure embraces methods of aligning a plurality of workpieces. An exemplary method may include placing an alignment plate on top of one or more elevating blocks situated adjacent to a plurality of workpieces loaded into respective workpiece docks of a build plate, and pushing the plurality of workpieces against the alignment plate using biasing members respectively situated between the build plate and the plurality of workpieces such that respective workpiece-interfaces of the workpieces align with one another when in contact with the alignment plate.

Further, another aspect of the present disclosure embraces methods of additively printing on a plurality of workpieces. An exemplary method may include mounting a plurality of workpieces in a workpiece-assembly, and additively printing on the workpieces, such as on the workpiece-interfaces of the workpieces.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 2A and 2B respectively show a plurality of workpieces misaligned with a build plane and a recoater consequently failing to successfully apply a uniform layer of powder across the build plane;

FIGS. 3A and 3B respectively show a plurality of workpieces aligned with a build plane and a recoater successfully applying a uniform layer of powder across the build plane;

FIGS. 5A and 5B respectively show perspective views of a workpiece and of a workpiece shoe holding a workpiece;

FIG. 5C shows a perspective view of build plate, with an enlarged view of an exemplary workpiece dock and an enlarged view of the workpiece shoe of FIG. 5B inserted into a workpiece dock while holding a workpiece;

FIG. 8 is a flowchart depicting an exemplary method of additively printing on a plurality of workpieces.

Figure 1:
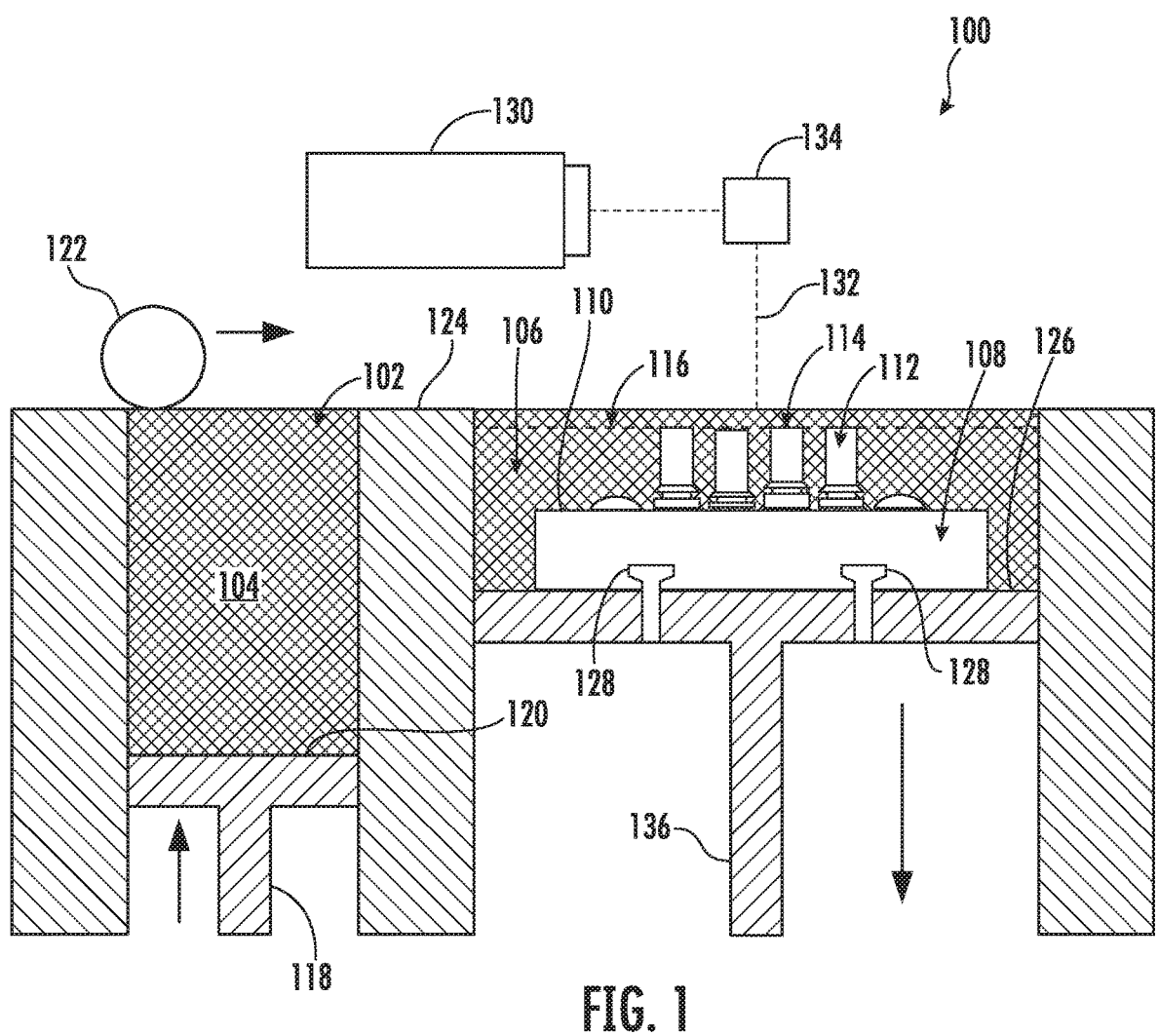
FIG. 1. schematically depicts a cross-sectional view of an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

As used herein, the term "near net shape" refers to an additively printed feature that has an as-printed shape that is very close to the final "net" shape. A near net shape component may undergo surface finishing such as polishing, buffing, and the like, but does not require heaving machining so as to achieve a final "net" shape. By way of example, a near net shape may differ from a final net shape by about 1,500 microns or less, such as about 1,000 µm or less, such as about 500 µm or less, or such as about 100 µm or less or such as about 50 µm or less or such as about 25 µm or less.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

The present disclosure generally provides additive manufacturing machines, systems, and methods configured to additively print on pre-existing workpieces. The pre-existing workpieces may include new workpieces as well as workpieces being repaired, rebuilt, or upgraded. In one aspect, workpiece-assemblies are provided that may be configured to hold a plurality of workpieces with a workpiece-interface such as a top portion of the workpieces respectively aligned with one another. The presently disclosed workpiece-assemblies may include biasing members that self-align the workpiece-interfaces (e.g., the top portions) of the workpieces with a build plane. The workpiece-assemblies, systems, and methods described herein allow for additively printing on the workpiece-interfaces of a plurality of workpieces simultaneously or concurrently as part of the same build. Among other advantages, such workpiece-assemblies may provide for improved productivity and reduced labor and time consumed when rebuilding workpieces. Additionally, with the workpiece-interfaces of workpieces aligned with one another, recoater failures may be minimized or eliminated, thereby reducing or eliminating the tendency for recoater failures when rebuilding multiple workpieces concurrently or simultaneously.

Exemplary embodiments of the present disclosure will now be described in further detail. FIG. 1 shows an exemplary additive manufacturing system 100. The exemplary additive manufacturing system 100 may include a powder bed fusion (PBF) system, such as a direct metal laser melting (DMLM) system, an electron beam melting (EBM) system, a selective laser melting (SLM) system, a directed metal laser sintering (DMLS) system, or a selective laser sintering (SLS) system. The additive manufacturing system 100 may be utilized to additively print on workpieces in a layer-by-layer manner by melting or fusing sequential layers of a powder material to one another. An exemplary additive manufacturing system 100 includes a powder supply chamber 102 that contains a supply of powder 104, and a build chamber 106. A workpiece-assembly 108 including a build plate 110 may be positioned in the build chamber 106, where the one or more workpieces 112 secured to the build plate 110 of the workpiece-assembly 108 may be additively rebuilt in a layer-by-layer manner. The one or more workpieces 112 may be secured to the build plate 110 with a workpiece-interface (e.g. a top surface) 114 of the respective workpieces 112 aligned to a build plane 116. The powder supply chamber 102 includes a powder piston 118 which elevates a powder floor 120 during operation of the system 100. As the powder floor 120 elevates, a portion of the powder 104 is forced out of the powder supply chamber 102.

A recoater 122 such as a roller or a blade pushes some of the powder 104 across a work surface 124 and onto a build platform 126. The build plate 110 may be secured to the build platform 126 with a chuck system 128 in a manner configured to position the build plate 110 on the build platform 126 and/or within the build chamber 106 with sufficiently high accuracy and precision. The workpieces 112 may be secured to the build plate 110 prior to securing the build plate 110 to the build platform 126. The recoater 122 fills the build chamber 106 with powder 104 and then sequentially distributes thin layers of powder 104 across the build plane 116 and across the workpiece-interfaces (e.g., the top surfaces) 114 of the workpieces 112 to additively print sequential layers on the workpiece-interfaces 114 of the workpieces 112. For example, the thin layers of powder 104 may be about 10 to 100 micrometers thick, such as about 20 to 80 μm thick, such as about 40 to 60 μm thick, or such as about 20 to 50 μm thick, or such as about 10 to 30 μm thick. With the workpiece-interfaces 114 aligned to the build plane 116, an interface between the build plane 116 and the workpiece-interfaces 114 may represent a plane corresponding to a next layer of powder 104 to be additively printed on the workpiece-interfaces 114 of the workpieces 112.

To additively print a layer on the workpiece-interfaces 114 of the workpieces 112, an energy source 130 directs an energy beam 132 such as a laser or an electron beam onto the thin layer of powder 104 along the build plane 116 to melt or fuse the powder 104 to the workpiece-interfaces 114 of the workpieces 112. A scanner 134 controls the path of the beam so as to melt or fuse only the portions of the powder 104 layer that are to become melted or fused to the workpieces 112. Typically, with a DMLM, EBM, or SLM system, the powder 104 is fully melted, with respective layers being melted or re-melted with respective passes of the energy beam 132. Conversely, with DMLS, or SLS systems, layers of powder 104 are sintered, fusing particles of powder 104 with one another generally without reaching the melting point of the powder 104. After a layer of powder 104 is melted or fused to the workpieces 112, a build piston 136 gradually lowers the build platform 126 by an increment, defining a next build plane 116 for a next layer of powder 104 and the recoater 122 to distributes the next layer of powder 104 across the build plane 116. Sequential layers of powder 104 may be melted or fused to the workpieces 112 in this manner until the additive printing process is complete.

Generally, the productivity of a rebuilding process may be enhanced by rebuilding multiple workpieces 112 concurrently. However, as shown in FIGS. 2A and 2B, misalignment of workpieces 112 from the build plane 116 may introduce additive printing failures. FIG. 2A shows a plurality of workpieces 112, including a first workpiece 200 situated in alignment with the build plane 116, a second workpiece 202 situated below the build plane 116, and a third workpiece 204 situated above the build plane 116. When the recoater 122 distributes powder 104 across the build plane 116 at the beginning of a rebuild process, the first workpiece 200 would generally be expected to receive an appropriately thick layer of powder 104 across the top portion thereof. By contrast, the second workpiece 202 and the third workpiece 204 illustrate misalignments from the build plane 116 which may likely cause rebuild failures. For example, the second workpiece 202 may exhibit rebuild failures attributable to an overly thick layer 206 of powder 104, such as insufficient bonding of the powder 104 layer to the second workpiece 202. Such insufficient bonding may be caused by incomplete melting of the powder 104 or top layer of the second workpiece 202, as well as voids formed from gasses trapped within the layer that with adequate melting generally would be eliminated. As another example, the third workpiece 204 may exhibit rebuild failures attributable to the surface 208 of the third workpiece 204 protruding above the build plane 116, such the recoater 122 skipping over the protruding surface 208 or the recoater 122 jamming as being unable to move past the protruding surface 208.

In some embodiments, mis-alignments between the workpiece-interfaces 114 of workpieces 112 may cause additive printing failures. Even if a mis-aligned workpiece does not cause a total printing failure such as jamming the recoater 122, the misalignment may cause variations in melting, dimensional inaccuracy, microhardness, tensile properties, and/or material density. These variations may propagate as sequential layers are added to the workpieces 112. Additionally, components formed by additively printing on workpieces 112 with such variations may fail during operation if returned to service, potentially causing damage to other equipment including catastrophic failures. For example, if a rebuilt compressor blade or turbine blade fails, the failure may damage other portions of the turbomachine potentially rendering the turbomachine immediately inoperable.

However, as shown in FIGS. 3A and 3B, the present disclosure provides a workpiece-assembly 108 configured to align the workpiece-interfaces 114 (e.g., the top portions) of a plurality of workpieces 112 with a build plane 116. Such workpiece-interface 114 may include a surface, a plane, a tip, or the like generally corresponding to the highest or tallest portion of the workpiece 112 when loaded into the workpiece-assembly 108. With the workpiece-interfaces 114 aligned, a plurality of components may be additively manufactured by additively printing on the workpiece-interfaces 114 of a plurality of workpieces 112, while assuring that the recoater 122 may apply uniformly thin layers of powder 104 across each of the workpieces 112. In some embodiments, the presently disclosed workpiece alignment systems 400 and workpiece-assemblies 108 may be capable of aligning a plurality of workpiece-interfaces 114 to a build plane 116 within a tolerance of 100 micrometers or less, such as 80 µm or less, such as 60 µm or less, such as 40 µm or less, such as 20 µm or less, or such as 10 µm or less.

Figure 4:
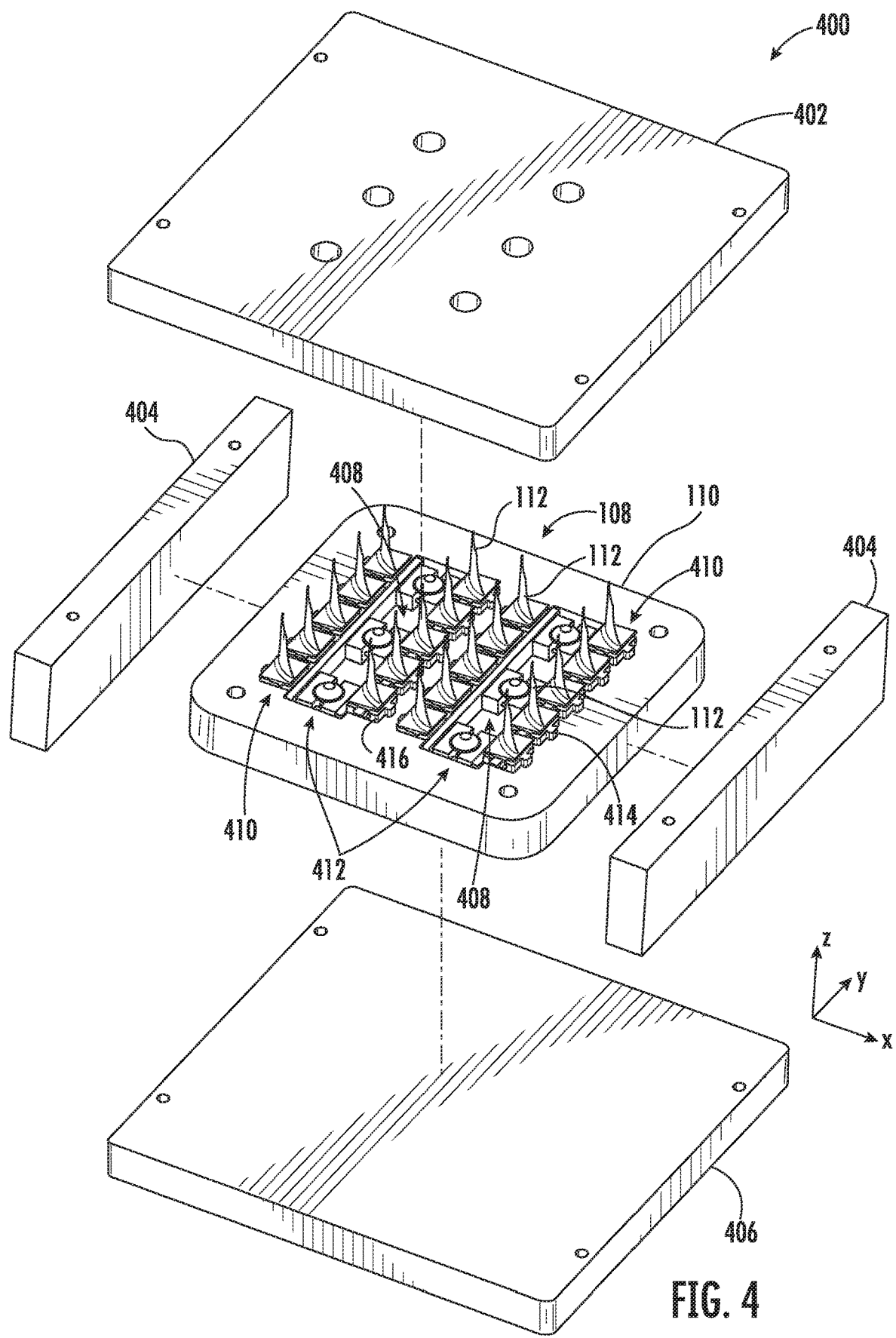
FIG. 4 shows an exemplary workpiece alignment system including an exemplary workpiece-assembly with a plurality of workpieces mounted therein with the top of the workpieces aligned with one another.

FIG. 4 shows an exemplary workpiece alignment system 400. The system includes a workpiece-assembly 108, an alignment plate 402, and one or more elevating blocks 404. In some embodiments, the alignment plate 402 and the one or more elevating blocks 404 may be separate components. Alternatively, the alignment plate 402 and the one or more elevating blocks 404 may define portions of as a single, integral component. For example, the alignment plate 402 and the one or more elevating blocks 404 may be formed as a single, seamless component, or the alignment plate 402 and the one or more elevating blocks 404 may be coupled to one another such as via fasteners, welds, or the like.

The workpiece-assembly 108 may hold any number of workpieces 112. For example, as shown, a workpiece-assembly 108 may hold up to 20 workpieces 112. As another example, a workpiece-assembly 108 may be configured to hold from 2 to 100 workpieces 112, or more, such as from 2 to 20 workpieces 112, such as from 10 to 20 workpieces 112, such as from 20 to 60 workpieces 112, such as from 25 to 75 workpieces 112, such as from 40 to 50 workpieces 112, such as from 50 to 100 workpieces 112, such as from 5 to 75 workpieces 112, such as from 75 to 100 workpieces 112, such as at least 2 workpieces 112, such as at least 10 workpieces 112, such as at least 20 workpieces 112, such as at least 40 workpieces 112, such as at least 60 workpieces 112, or such as at least 80 workpieces 112.

In some embodiments, for example, when the workpieces 112 are compressor blades or turbine blades of a turbomachine, the workpiece-assembly 108 may be configured to hold a number of blades that corresponds to the number of blades in one or more stages of the compressor and/or turbine, as applicable. In this way, all of the blades of a given one or more stages of a turbine and/or compressor may be kept together for additive printing in one single build. It will be appreciated that the workpiece-assembly 108 and the build plate 110 reflect one exemplary embodiment, which is provided by way of example and not to be limiting. Various other embodiments of a workpiece-assembly 108 and/or build plate 110 are contemplated which may also allow for the workpieces 112 to be secured with suitable positioning and alignment, all of which are within the spirit and scope of the present disclosure.

The alignment plate 402 and the one or more elevating blocks 404 are used to align the plurality of workpieces 112 in the workpiece-assembly 108 to a build plane 116. Optionally, the workpiece alignment system 400 may include a base plate 406. Alternatively, in some embodiments the base plate 406 shown in FIG. 4 may represent a build platform 126 of an additive manufacturing system 100. The workpiece-assembly 108 includes a build plate 110 with one or more workpiece bays 408 disposed therein. Each of the one or more workpiece bays 408 may include one or more workpiece docks 410. In some embodiments, the one or more elevating blocks 404 may be an integral part of the build plate 110. For example, the build plate 110 and the one or more elevating blocks 404 may define portions of as a single, integral component. For example, the build plate 110 and the one or more elevating blocks 404 may be formed as a single, seamless component, or the build plate 110 and the one or more elevating blocks 404 may be coupled to one another such as via fasteners, welds, or the like. Alternatively, the one or more elevating blocks 404 may be a separate component of the workpiece alignment system 400. In some embodiments, the one or more workpiece bays 408 may additionally include one or more clamping mechanisms 412 which operate to secure one or more workpieces 112 to the build plate 110. The one or more workpiece docks 410 may be configured to receive a workpiece shoe 414, which workpiece shoe 414 may be configured to receive a workpiece 112. The one or more clamping mechanisms 412 may be configured to clamp the workpiece shoes 414 in position within the corresponding workpiece docks 410.

As shown in FIG. 4, two elevating blocks 404 are provided. However, it will be appreciated that one or more elevating blocks 404 may be provided, and that the elevating blocks 404 may be configured in any desired manner so as to position an alignment plate 402 at a suitable position so as to align the plurality of workpieces 112 in the workpiece-assembly 108 to a build plane 116, all of which are within the spirit and scope of the present disclosure. As another example, an elevating block 404 may take the form of a ring, such as a rectangular ring, that surrounds the workpieces. As yet another example, the base plate 406 and the one or more elevating blocks 404 may define portions of as a single, integral component. For example, the base plate 406 and the one or more elevating blocks 404 may be formed as a single, seamless component, or the base plate 406 and the one or more elevating blocks 404 may be coupled to one another such as via fasteners, welds, or the like.

Now referring to FIGS. 5A and 5B, further aspects of mounting of one or more workpieces 112 in a workpiece-assembly 108 will be described. In an exemplary embodiment, to mount one or more workpieces 112 in a workpiece-assembly 108, each of one or more workpieces 112 (FIG. 5A) may be coupled to a workpiece shoe 414 (FIG. 5B). The workpiece shoe 414 may have a size and shape complementary to a workpiece dock 410 and/or a workpiece bay 408 of the build plate 110. The workpiece block 414 may include a slot 506 configured to securely hold a workpiece 112 and allow the workpiece to be aligned to a build plane 116. The slot 506 may have any desired shape complementary to a portion of the workpiece 112. A workpiece 112 may slidably engage and interlock with the slot 506, providing a sufficiently snug fit minimizing or preventing the workpiece 112 from moving or wiggling relative to the workpiece shoe 414 other than from the sliding insertion or removal. The workpiece 112 may be laterally inserted into or removed from the slot 506, such as in a Y-direction. However, it will be appreciated that a slot 506 may be oriented vertically so as to allow the workpiece 112 to be slidably inserted in a Z-direction. In fact, any insertion angle may be provided, all of which are within the spirit and scope of the present disclosure. In some embodiments, a set-screw (not shown) may be provided through a recess 508 to secure the workpiece 112 within the dovetail slot 506 of the workpiece shoe 414.

In an exemplary embodiment, the workpiece 112 may include an airfoil such as a compressor blade 500. The compressor blade 500 may have a conventional dovetail 502, which may have any suitable form including laterally opposed tangs 504 that engage a complementary dovetail slot in a rotor disk of a turbomachine for radially retaining the compressor blade 500 to the disk as it rotates during operation. While a compressor blade 500 is shown in the exemplary embodiment, it will be appreciated that the present disclosure also embraces other airfoils that may be utilized in a turbomachine, including turbine blades, as well as any other workpiece 112 that may be additively rebuilt, all of which are within the spirit and scope of the present disclosure. As shown in FIG. 5B, an exemplary workpiece shoe 414 may include a dovetail slot 506 complementary to the dovetail 502 and/or tangs 504 of the compressor blade 500. The dovetail 502 of the compressor blade 500 may be laterally inserted into or removed from the dovetail slot 506, such as in a Y-direction. The dovetail 502 and the dovetail slot 506 may slidably engage and interlock with one another, providing a sufficiently snug fit minimizing or preventing the compressor blade 500 from moving or wiggling relative to the workpiece shoe 414 other than from the sliding insertion or removal.

A workpiece shoe 414 may include any number of slots 506, and a given slot 506 may be of any desired length, so as to hold any number of workpieces 112. The exemplary workpiece shoe 414 shown in FIG. 5B has a slot 506 with a length sufficient to hold a single workpiece 112, but it will be appreciated that a workpiece shoe 414 may also be configured with additional slots 506 and/or longer slots 506 so as to hold a plurality of workpieces 112. However, in exemplary embodiments generally it may be desirable for each individual workpiece 112 to be inserted in a separate workpiece shoe 414 so as to allow each individual workpiece 112 to be separately alignable to a build plane 116. While a compressor blade 500 is shown as an exemplary workpiece 112, it will be appreciated that the presently disclosed 400 workpiece alignment system 400 and/or workpiece-assembly 108 may be configured for use with any other workpiece 112. In fact, numerous other workpieces 112 are contemplated, all of which are within the spirit and scope of the present disclosure.

As shown in FIG. 5B, the workpiece shoe 414 includes a dovetail slot 506 that engages and interlocks with a dovetail 502 of a compressor blade 500. It will be appreciated that a workpiece shoe 414 may similarly include a dovetail slot 506 that engages and interlocks with a dovetail 502 portion of other workpieces 112. Alternatively, a workpiece shoe 414 may include any other complementary slot, recess, groove, or the like corresponding to a feature of any such other workpiece 112 such that the feature engages and interlocks with the workpiece shoe 414. Additionally, or the alternative, a workpiece shoe 414 may include one or more set screws, clamps, or the like configured to secure a workpiece 112 to the workpiece shoe 414.

Exemplary workpiece shoes 414 have a shape complementary to a workpiece dock 410 in a build plate 110 of a workpiece-assembly 108. FIG. 5C shows an enlarged view V1 of an exemplary workpiece dock 410 and an enlarged view V2 of the workpiece shoe 414 of FIG. 5B inserted into a workpiece dock 410 while holding a workpiece 112. As shown in the enlarged view V1, a workpiece dock 410 includes a recess in the build plate 110 having a perimeter defined in part by a plurality of lateral walls 510. The perimeter of the lateral walls 510 defining the workpiece dock 410 corresponds to at least a portion of the perimeter of one or more workpiece shoes 414, such that the one or more workpiece shoes 414 may fit within the workpiece dock 410. A workpiece shoe 414 may slidably engage with workpiece dock 410. For example, the workpiece shoe 414 to slide vertically (e.g., along a Z-axis), while minimizing or preventing lateral movement (e.g., along the X-axis and/or Y-axis).

In some embodiments, a workpiece shoe 414 may include a dovetail key 512 (FIG. 5B), and the workpiece dock 410 may include a docking-dovetail slot 514 complementary to the dovetail key 512 of the workpiece shoe 414. The dovetail key 512 of the workpiece shoe 414 may slidably engage and interlock with the docking-dovetail slot 514 of the workpiece dock 410. For example, the workpiece shoe 414 may be inserted vertically (e.g., along the Z-axis) into a complementary docking-dovetail slot 514 of a workpiece dock 410. However, it will be appreciated that a dovetail key 512 of a workpiece shoe 414 and corresponding docking-dovetail slot 514 may be oriented horizontally so as to allow the workpiece shoe 414 to be slidably inserted laterally into the workpiece dock 410. Any insertion angle may be provided, all of which are within the spirit and scope of the present disclosure. The docking-dovetail slot 514 of the workpiece dock 410 snugly engages and interlocks with the dovetail key 512 of the workpiece shoe 414, minimizing or preventing the workpiece shoe 414 from moving or wiggling relative to the workpiece dock 410 apart from movement in the vertical direction.

The workpiece dock 410 and/or the workpiece shoe 414 include one or more biasing members 516 which exert a biasing force (e.g., an upward or vertical biasing force) between the workpiece shoe 414 and the build plate 110 such as the bottom of the workpiece dock 410. The biasing members 516 may include one or more springs, one or more magnet pairs (e.g. permanent magnets or electromagnets), one or more piezoelectric actuator, or the like operable to exert such a biasing force. The biasing force exerted by the biasing members biases 516 on the workpiece shoe 414 so as to allow the workpiece-interface 114 of the workpiece 112 to be aligned with the alignment plate 402. The biasing members 516 may also include one or more pistons, lever arms, or other linkages configured to translate and/or amplify the biasing motion thereof. In some embodiments, one or more biasing members 516 may be located outside of the workpiece dock 410 and/or outside of the workpiece bay 408, and a translation and/or amplification element may interact with the workpiece shoe 414 so as to exert a biasing force between the workpiece shoe 414 and the build plate 110. Additionally, or alternatively, biasing members 516 may be coupled to the build plate 110 (e.g., at a bottom surface of the workpiece docks 410) and/or to the workpiece shoes 414.

As shown in FIG. 5B, a workpiece shoe 414 may additionally or alternatively include a first biasing recess 518 configured to receive a portion of the biasing member 516. Additionally, or in the alternative, as shown in the enlarged view V1 of FIG. 5C, a second biasing recess 520 may be located at a bottom surface of a workpiece dock 410 so as to receive a portion of the biasing member 516. A biasing member 516 may be secured within the first biasing recess 518 and/or the second biasing recess 520, for example, with an interference fit, such as a press fit, a friction fit, a snap-fit, or the like. In some embodiments, a first portion of a biasing member 516 may be situated or secured within the first biasing recesses 518 of a workpiece shoe 414, and a second portion of the biasing member may be situated within the second biasing recess 520 of a workpiece dock 410. A workpiece shoe 414 may be generally secured to the build plate 110 by an interference fit between respective ends of one or members 516 and the first and second biasing recesses 518, 520. Alternatively, a workpiece shoe 414 may be easily removable from a workpiece dock 410. For example, when a biasing recess 518, 520 provides a relatively loose interference fit.

In some embodiments, a plurality of workpieces 112 may be coupled to a corresponding plurality of workpiece shoes 414, and the workpiece shoes 414 may be inserted into a corresponding plurality of workpiece docks 410. Alternatively, when the workpiece shoes 414 are secured to the build plate 110, a workpiece 112 may still be coupled to a workpiece shoe 414 without removing the workpiece shoe 414 from the build plate 110. For example, as shown in the enlarged view V2 of FIG. 5C, the biasing members 516 may be fit within corresponding biasing recesses 518, 520 so as to position the workpiece shoes 414 at a vertical position that leaves the dovetail slot 506 of the workpiece shoe 414 accessible, such that a dovetail 502 of a workpiece 112 may be inserted laterally into the dovetail slot 506 of the workpiece shoe 414 as indicated by arrow 522.

Still referring to FIG. 5C, in some embodiments, a build plate 110 may include one or more clamping mechanisms 412. A clamping mechanism 412 may movably engage with one or more workpiece shoes 414 inserted within corresponding workpiece docks 410, exerting a clamping force upon the one or more workpiece shoes 414 so as to lock the one or more workpiece shoes 414 in position within the respective workpiece docks 410. In some embodiments, a clamping force exerted upon a workpiece shoe 414 by a clamping mechanism 412 may translate at least in part to a workpiece 112 within the workpiece shoe 414, thereby securing the workpiece 112 in position within the workpiece shoe 414. Additionally, or in the alternative, a workpiece 112 may be secured in position within the workpiece shoe 414 by a separate clamping mechanism, such as a set-screw (not shown) or other movably engagable mechanism which may be accessible, for example, through a recess 508 in the workpiece shoe 414.

As shown in the enlarged view V2 of FIG. 5C, an exemplary clamping mechanism 412 may include one or more edge clamps 524. Other clamping mechanisms 412 are also contemplated, all of which are within the spirit and scope of the present disclosure. An exemplary edge clamp 524 includes a wedge segment 526 and one or more jaw segments 528, and a loading mechanism 530 such as a threaded bolt or the like. The wedge segment 526 may include any wedge-type shape, including a wedge, a pyramid, a cupola, a frustum, a rhombohedron, and so forth. The wedge segment 526 and the loading mechanism 530 may be separate components or part of one integrated component. In some embodiments, an edge clamp 524 may engage directly with a workpiece shoe 414. Alternatively, a clamping mechanism 412 may include one or more clamping rails 532 located between one or more edge clamps 524 on one side and one or more workpiece docks 410 on another. A clamping rail 532 may be fixedly coupled to one or more edge clamps 524. Alternatively, or in addition, a clamping rail 532 may float freely between one or more edge clamps 524 and one or more workpiece docks 410.

Figure 6A:
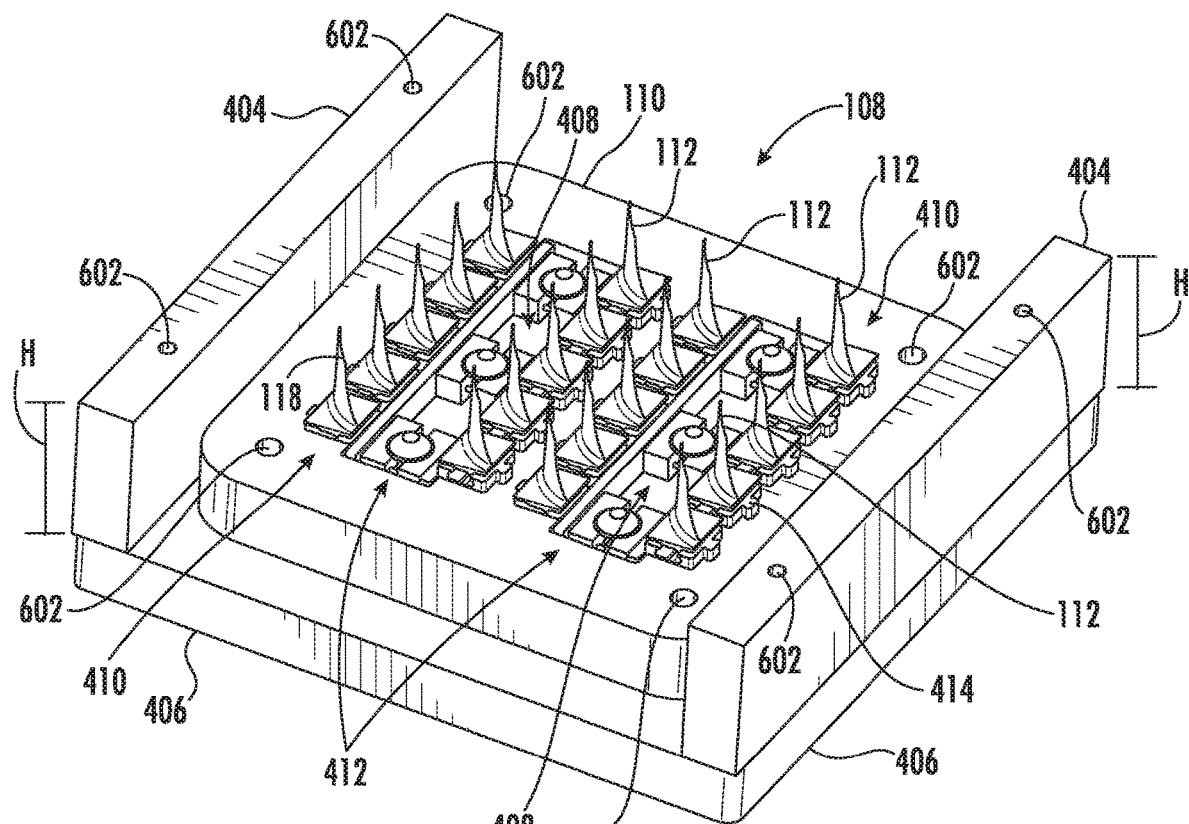
FIG. 6A shows a perspective view of an exemplary workpiece-assembly positioned on a baseplate and a plurality of elevating blocks positioned adjacent to the workpiece-assembly.
Figure 6B:
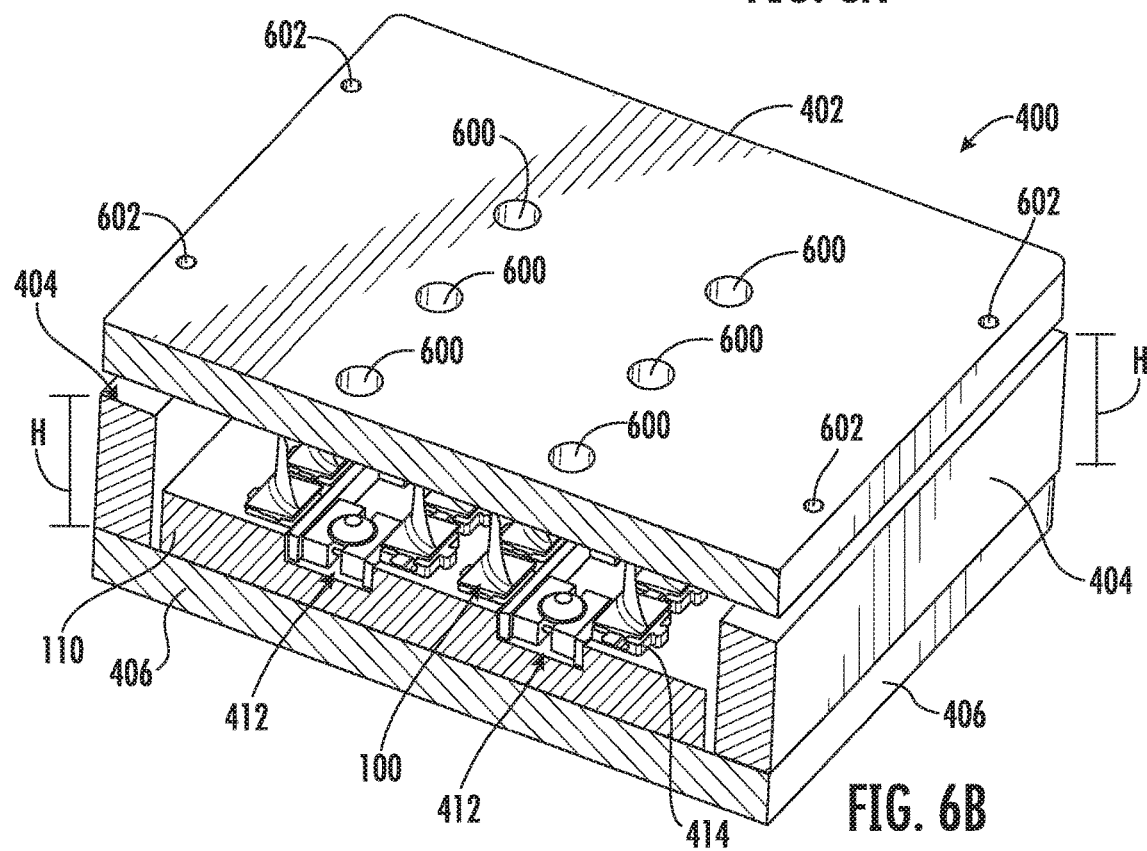
FIG. 6B shows a perspective view of an exemplary alignment plate positioned above the workpiece-assembly of FIG. 6A.
Figure 6C:
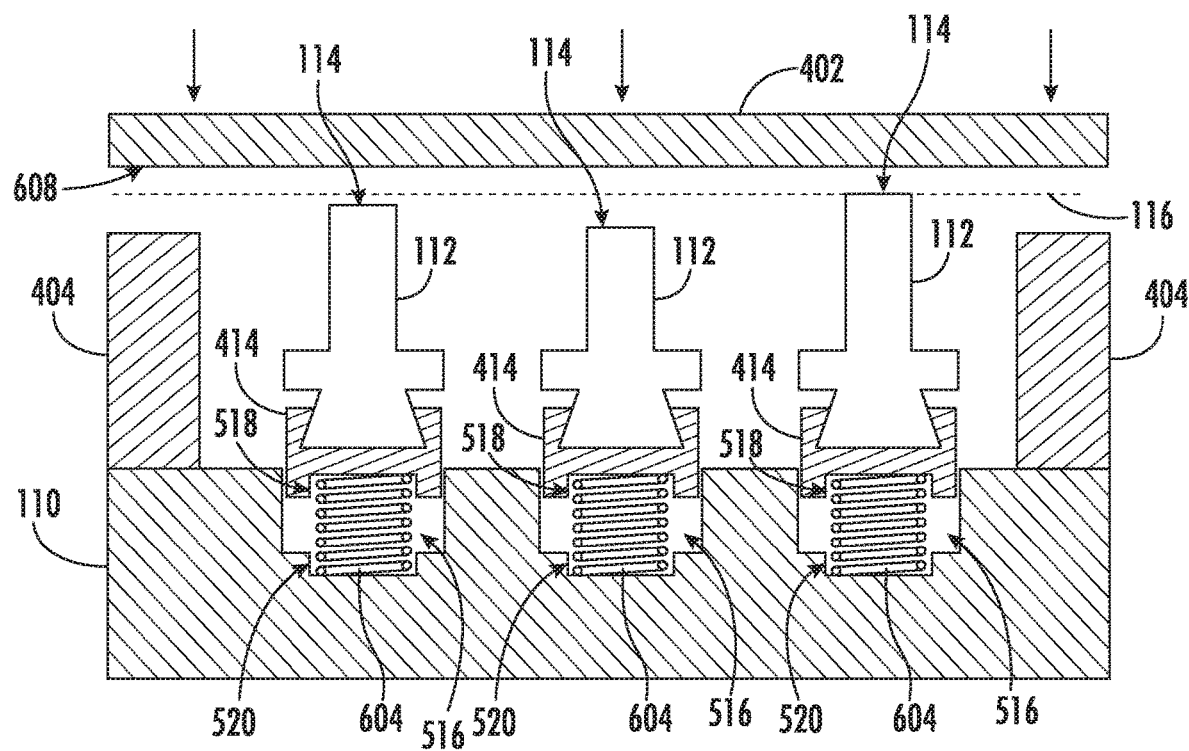
FIGS. 6C and 6D schematically show aligning a plurality of workpieces with a build plane according to one embodiment of a workpiece-assembly.
Figure 6D:
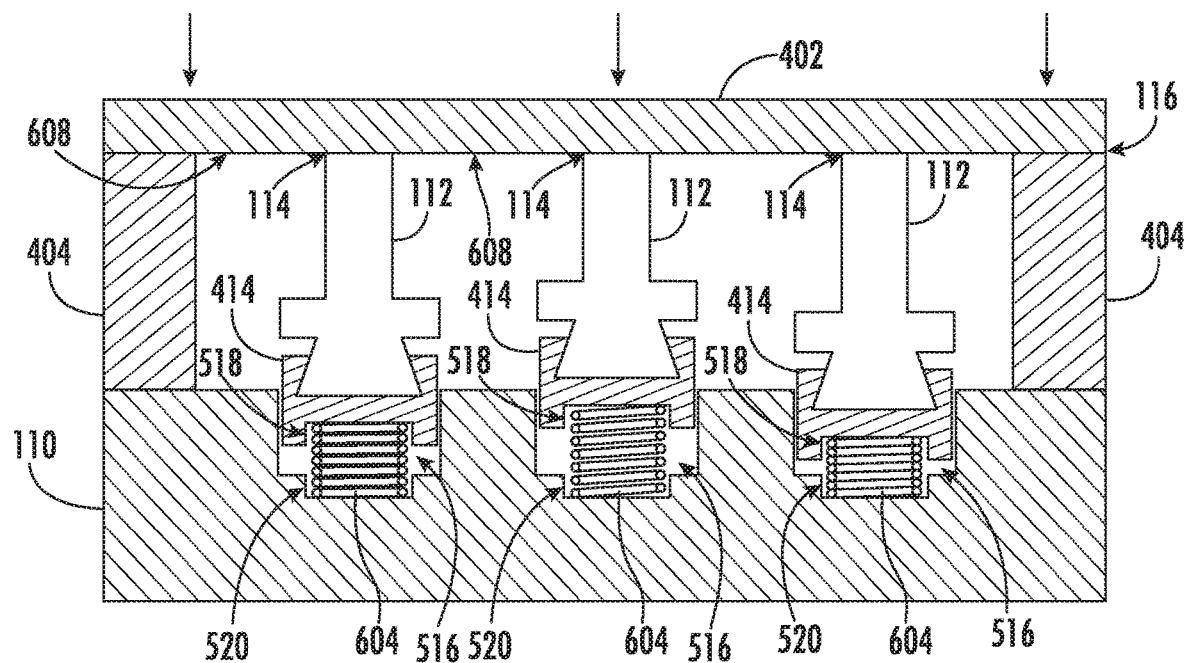
Figure 6E:
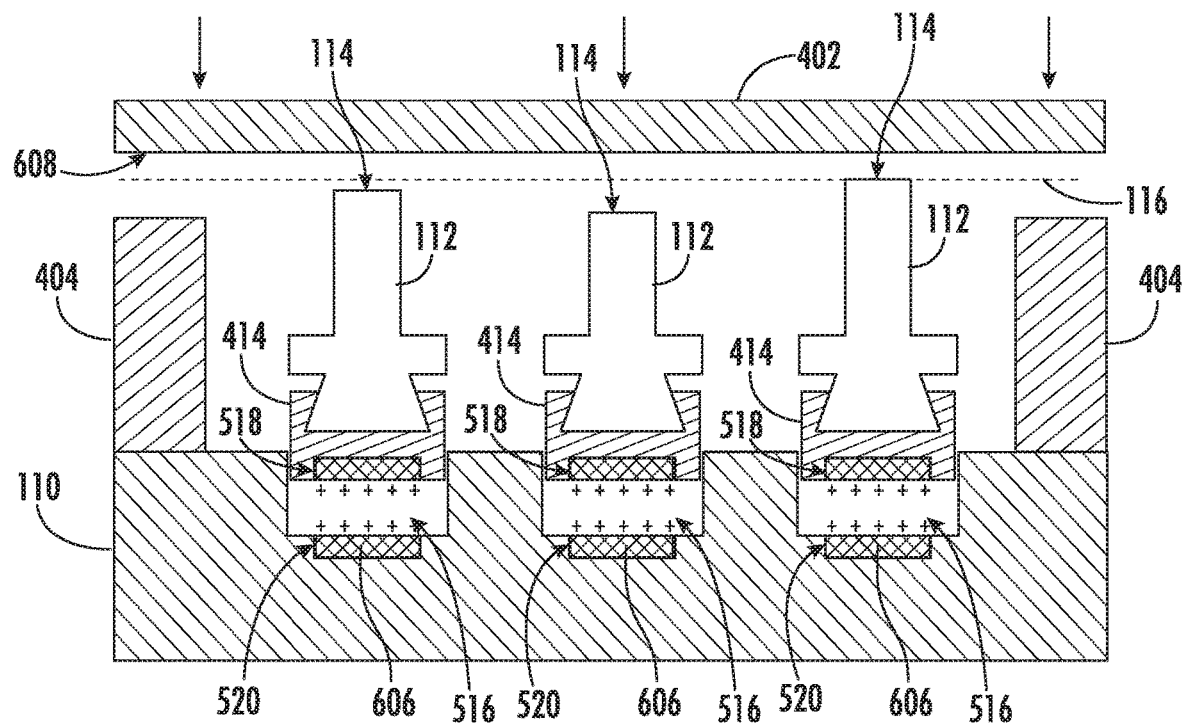
FIGS. 6E and 6F schematically show aligning a plurality of workpieces with a build plane according to another embodiment of a workpiece-assembly.

Now turning to FIGS. 6A-6F, alignment of workpieces 112 with an alignment plate 402 will be described in further detail. As mentioned, exemplary workpiece alignment systems 400 include an alignment plate 402 and one or more elevating blocks 404. A plurality of workpieces 112 may be aligned with the alignment plate 402 using one or more elevating blocks 404 to position the alignment plate 402 at a suitable elevation above a build plate 110 holding the workpieces 112. As shown in FIG. 6A, a plurality of workpiece shoes 414 are situated within respective workpiece docks 410 of a build plate 110, with each workpiece shoe 414 holding a corresponding workpiece 112. A clamping mechanism 412 may be in a loosened position, such that the workpiece shoes 414 my freely move downwards and/or upwards, such as under downward force exerted by the alignment plate 402 and/or by upwards force exerted by one or more corresponding biasing members 516 (FIG. 6C-6E).

The one or more elevating blocks 404 may be positioned adjacent to the plurality of workpieces 112, such as adjacent to the build plate 110, on top of the build plate 110, adjacent to the base plate 406, or on top of the base plate 406. The one or more elevating blocks 404 have a height, H which corresponds to a desired elevation of the alignment plate 402. When aligning the workpieces 112 with the alignment plate 402, the alignment plate 402 should be at such as height that a workpiece-interface 114 (e.g., a top surface) of each workpiece 112 contacts the alignment plate 402. Preferably, a bottom surface of the alignment plate 402 partially compresses the biasing member(s) 516 corresponding to each respective workpiece 112, such that a counteracting force of the partially compressed biasing member(s) 516 respectively align the workpiece-interface (e.g., the top surface) 114 of the respective workpiece 112 with the bottom surface of the alignment plate 402.

The height, H of the one or more elevating blocks 404 may be selected so as to correspond to the elevation of the build plane 116. In some embodiments, the height, H of the one or more elevating blocks 404 and/or the elevation of the build plane 116 may be slightly less than the height of the workpieces 112 when situated in the build plate 110. For example, the height, H may correspond to slightly less than the minimum height of the workpieces 112 when situated in the build plate 110. In this way, the biasing member(s) 516 corresponding to each respective workpiece 112 may be partially compressed when the alignment plate 402 is positioned on top of the one or more elevating blocks 404. In some embodiments, a variety of elevating blocks 404 with different heights, H may be provided so as to accommodate different workpieces 112, or workpieces 112 that have different sizes. Elevation blocks 404 that have an appropriate height, H may be selected depending on the height of the workpieces 112 situated in the build plate 110.

Once the alignment plate 402 has been positioned on an appropriately-sized one or more elevating blocks 404, the workpiece-interfaces 114 (e.g., the top portions) of the workpieces 112 may self-align to the bottom surface of the alignment plate 402 under force of the biasing members 516. The clamping mechanism 412 may be tightened while the alignment plate 402 remains situated on the one or more elevating blocks 404, thereby securing the workpieces 112 to the build plate 110 with the workpiece-interfaces 114 of the workpieces 112 aligned with one another. As shown in FIG. 6B, an alignment plate 402 may include one or more passages 600 that allow access to the loading mechanism 530 of the clamping mechanism 412. For example, a passage 600 may be situated above a loading mechanism 530, and the passage 600 may provide a pathway for a tool to engage with the loading mechanism 530. The loading mechanism 530 may include a bolt head and/or a socket such as a hexagonal socked, a slotted socket, or the like, and a tool such as a socket wrench, a hex-key, or other driver may be passed through the passage 600 so as to tighten or loosen the loading mechanism 530. The alignment plate 402, the one or more elevating blocks 404, the base plate 406, and/or the build plate 110 include coupling elements 602, such as holes configured to receive pins, bolts, or the like. Such coupling elements 602 may be utilized to couple the respective parts of a workpiece alignment system 400 together, such as for transport between workstations and so forth.

Figure 6F:
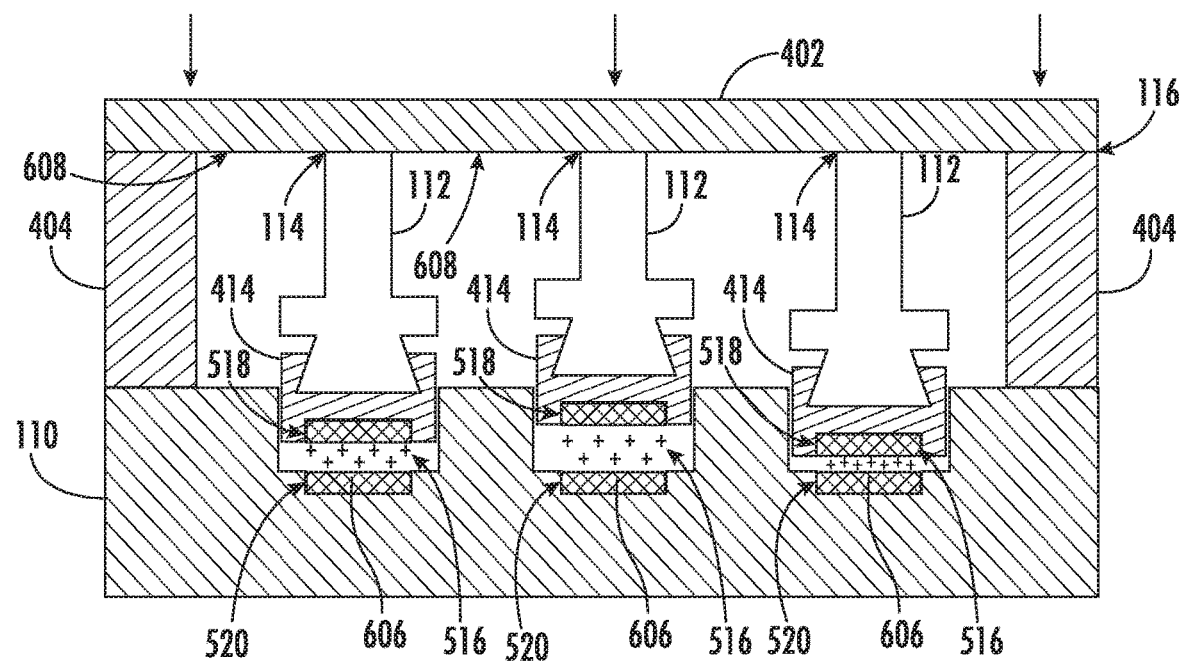

As shown in FIGS. 6C and 6D, in some embodiments the biasing members 516 may include one or more springs 604, such as compression springs. As shown in FIGS. 6E and 6F, in some embodiments the biasing members 516 may include one or more magnet pairs 606 with like charge facing one another. The magnet pairs 606 may be permanent magnets or electromagnets. Regardless of the type of biasing member 516, with the alignment plate 402 situated on the one or more elevating blocks 404, the biasing members 516 exert a force on the workpiece shoes 414, which force pushes the workpiece-interfaces 114 of the workpieces 112 against the bottom surface 608 of the alignment pate 402, thereby aligning the workpiece-interfaces 114 of the workpieces 112 with the build plane 116.

Figure 7:
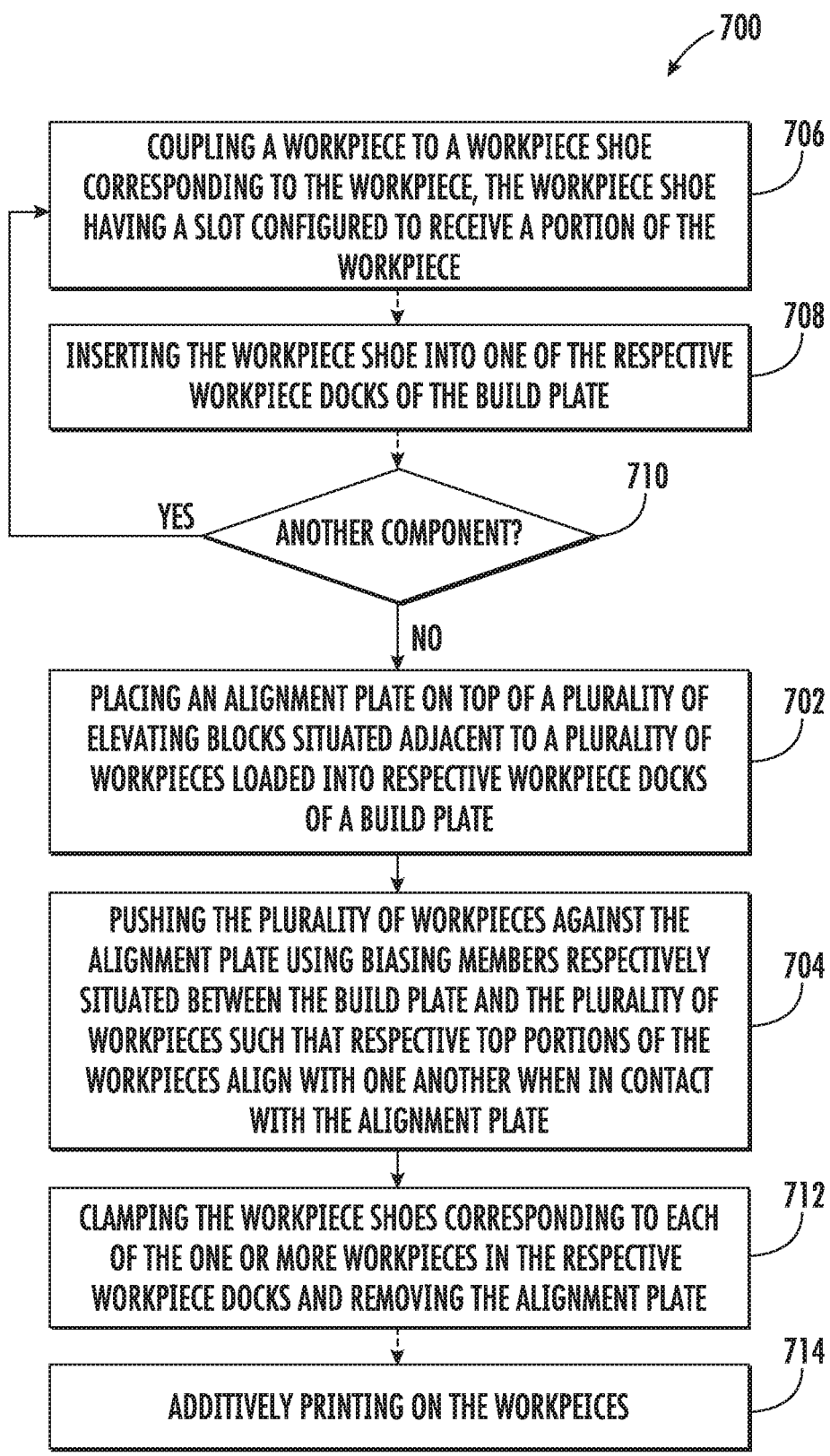
FIG. 7 is a flowchart depicting an exemplary method of mounting one or more workpieces in a workpiece-assembly.

Now turning to FIG. 7, exemplary methods of mounting and/or aligning workpieces 112 in a workpiece-assembly 108 will be described. Exemplary methods may be performed with one or more workpieces 112, including mounting and/or aligning a plurality of workpieces 112 using a workpiece alignment system 400 and/or a workpiece-assembly 108. As shown in FIG. 7, an exemplary method 700 includes, at step 702, placing an alignment plate 402 on top of one or more elevating blocks 404 situated adjacent to a plurality of workpieces 112 loaded into respective workpiece docks 410 of a build plate 110, and, at step 704, pushing the plurality of workpieces 112 against the alignment plate 402 using biasing members 516 respectively situated between the build plate 110 and the plurality of workpieces 112 such that respective workpiece-interfaces 114 of the workpieces 112 align with one another when in contact with the alignment plate 402. The workpieces 112 may be loaded into workpiece shoes 414, and the workpiece shoes 414 may be loaded into the respective workpiece docks 410. The workpiece shoes 414 may have a slot configured to receive a portion of the workpiece 112.

In some embodiments, an exemplary method 700 may additionally include, at step 706, for each of the plurality of workpieces 112, coupling a workpiece 112 to a workpiece shoe 414 corresponding to the workpiece 112, and, at step 808, inserting the workpiece shoe 414 into one of the respective workpiece docks 410 of the build plate 110. The coupling and inserting steps 706, 708 may be repeated at step 710 such that each of the plurality of workpieces 112 are loaded into respective workpiece docks 410 of the build plate 110. An exemplary method 700 may further include, at step 712, clamping the plurality of workpiece shoes 414 in the respective workpiece docks 410 removing the alignment plate from on top of one or more elevating blocks 404. An exemplary method 700 may also optionally include, at step 714, additively printing on the workpieces 112, such as on the workpiece-interfaces 114 of the workpieces 112.

Now turning to FIG. 8, an exemplary method 800 of additively printing on a plurality of workpieces 112 will be discussed. The exemplary method 800 includes, at step 802, mounting a plurality of workpieces 112 in a workpiece-assembly 108, and at step 804, additively printing on the workpieces 112, such as on the workpiece-interfaces 114 of the workpieces 112. The workpieces 112 may be mounted in the workpiece-assembly 108 as described with reference to FIG. 7.

The exemplary methods 700, 800 described herein may be performed using any additive manufacturing system, including a powder bed fusion (PBF) system such as a direct metal laser melting (DMLM) system, an electron beam melting (EBM) system, a selective laser melting (SLM) system, a directed metal laser sintering (DMLS) system, or a selective laser sintering (SLS) system. The workpieces 112 may be formed of any type of material, and an additive manufacturing system 100 may be selected that corresponds to the type of material from which the workpieces 112 are formed and/or the type of material to be utilized in rebuilding the workpieces 112. As examples, a workpiece 112 and/or a rebuild material for a workpiece 112 may include a metal or metal alloy, a plastic, a ceramic, and/or a composite. As examples, a metal or metal alloy may include tungsten, aluminum, chromium, copper, cobalt, molybdenum, tantalum, titanium, nickel, and steel, and combinations thereof, as well as superalloys, such as austenitic nickel-chromium-based superalloys.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A workpiece-assembly apparatus, the apparatus comprising:
   a build plate comprising a workpiece bay, the workpiece bay comprising a plurality of workpiece docks;
   a plurality of workpiece shoes respectively inserted or insertable into the plurality of workpiece docks; the workpiece shoes respectively comprising a slot configured to receive a portion of one or more workpieces;
   a plurality of biasing members respectively situated or situatable between the build plate and the plurality of workpiece shoes so as to exert a biasing force upon the workpiece shoes; and
   one or more clamping mechanisms coupled or couplable to the workpiece bay of the build plate and operable to secure the plurality of workpiece shoes within the respective workpiece docks.

2. The apparatus of claim 1, wherein the workpieces comprise compressor blades or turbine blades.

3. The apparatus of claim 1, wherein the slot corresponding to the workpiece shoes comprises a dovetail slot configured to receive a dovetail of a compressor blade or a dovetail of a turbine blade.

4. The apparatus of claim 1, wherein the plurality of workpiece docks respectively comprise dovetail slots and the workpiece shoes respectively comprise dovetail keys, the dovetail slots configured to receive the dovetail keys.

5. The apparatus of claim 1, wherein the biasing members comprise one or more springs, one or more magnet pairs, and/or one or more piezoelectric actuators.

6. The apparatus of claim 1, wherein the one or more clamping mechanisms comprise one or more edge clamps.

7. The apparatus of claim 6, wherein the one or more edge clamps comprise:
   one or more wedge segments;
   one or more jaw segments; and
   one or more loading mechanisms.

8. The apparatus of claim 7, wherein the one or more edge clamps comprise one or more clamping rails.

9. A system for aligning a plurality of workpieces with a build plane, the system comprising:
   an alignment plate;
   one or more elevating blocks; and
   a workpiece-assembly apparatus, comprising:
      a build plate comprising a workpiece bay, the workpiece bay comprising a plurality of workpiece docks;
      a plurality of workpiece shoes respectively inserted or insertable into the plurality of workpiece docks; the workpiece shoes respectively comprising a slot configured to receive a portion of one or more workpieces;
      a plurality of biasing members respectively situated or situatable between the build plate and the plurality of workpiece shoes so as to exert a biasing force upon the workpiece shoes; and
      one or more clamping mechanisms coupled or couplable to the workpiece bay of the build plate and operable to secure the plurality of workpiece shoes within the respective workpiece docks.

10. The system of claim 9, wherein the one or more elevating blocks have a height corresponding to a desired elevation of the build plane.

11. The system of claim 9, wherein with the workpieces loaded in the workpiece-assembly apparatus, the one or more elevating blocks situated adjacent to the workpieces, and the alignment plate applied situated on the one or more elevating blocks, the biasing members exert a force on the workpiece shoes, thereby pushing respective workpiece-interfaces of the workpieces against a bottom surface of the alignment plate.

12. The system of claim 9, comprising a variety of elevating blocks with different heights so as to accommodate different workpieces and/or workpieces that have different sizes.

13. A method of aligning a plurality of workpieces, the method comprising:
   placing an alignment plate on top of one or more elevating blocks situated adjacent to a plurality of workpieces loaded into respective workpiece docks of a build plate, the build plate comprising a workpiece bay, and the workpiece bay comprising the respective workpiece docks; and
   pushing the plurality of workpieces against the alignment plate using biasing members respectively situated between the build plate and the plurality of workpieces such that respective workpiece-interfaces of the workpieces align with one another when in contact with the alignment plate.

14. The method of claim 13, wherein the workpieces are loaded into respective workpiece shoes, and the workpiece shoes are loaded into the respective workpiece docks.

15. The method of claim 13, comprising:
   for each of the plurality of workpieces, coupling a workpiece to a workpiece shoe corresponding to the workpiece, the workpiece shoe having a slot configured to receive a portion of the workpiece;
   inserting the workpiece shoe into one of the respective workpiece docks of the build plate; and repeating the coupling and inserting steps such that each of the plurality of workpieces are loaded into respective workpiece docks of the build plate.

16. The method of claim 15, comprising:

clamping the workpiece shoes in the respective workpiece docks; and removing the alignment plate from on top of one or more elevating blocks.

17. The method of claim 16, comprising:

commencing an additive printing process.

18. The method of claim 17, comprising:

commencing an additive printing process utilizes a powder bed fusion (PBF) system.

19. The method of claim 18, wherein the PBF system comprises a direct metal laser melting (DMLM) system, an electron beam melting (EBM) system, a selective laser melting (SLM) system, a directed metal laser sintering (DMLS) system, or a selective laser sintering (SLS) system.

20. The method of claim 13, wherein the workpieces comprise compressor blades or turbine blades.

\* \* \* \* \*